(12) United States Patent
Park

(10) Patent No.: US 8,189,274 B2
(45) Date of Patent: May 29, 2012

(54) IMAGING OPTICAL SYSTEM

(75) Inventor: Il Yong Park, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 12/923,349

(22) Filed: Sep. 15, 2010

(65) Prior Publication Data

US 2011/0102912 A1  May 5, 2011

(30) Foreign Application Priority Data

Nov. 2, 2009 (KR) .......................... 10-2009-0104974

(51) Int. Cl.
*G02B 9/34* (2006.01)
(52) U.S. Cl. ........ 359/772; 359/644; 359/660; 359/715; 359/739; 359/771; 359/773; 359/774
(58) Field of Classification Search .................. 359/644, 359/660, 715, 739, 771–774
See application file for complete search history.

(56) References Cited

U.S. PATENT DOCUMENTS

| 2008/0180816 | A1* | 7/2008 | Nakamura | 359/773 |
| 2009/0015944 | A1 | 1/2009 | Taniyama | |

FOREIGN PATENT DOCUMENTS

| CN | 101344632 A | 1/2009 |
| JP | 2002-365529 | 12/2002 |
| JP | 2008-242180 | 10/2008 |
| JP | 2009-69196 | 4/2009 |
| KR | 10-2009-0005964 | 1/2009 |

OTHER PUBLICATIONS

Korean Office Action issued May 25, 2011 in corresponding Korean Patent Application 10-2009-0104974.
Chinese Office Action issued Jan. 5, 2012 in corresponding Chinese Patent Application No. 201010290549.0.

* cited by examiner

*Primary Examiner* — Evelyn A. Lester

(57) ABSTRACT

There is provided an imaging optical system installed in a mobile communications terminal and a personal digital assistant (PDA) or utilized in a surveillance camera and a digital camera. The imaging optical system including, sequentially from an object side in front of an image plane: a first lens having positive refractive power and two convex surfaces; a second lens having negative refractive power and two concave surfaces; a third lens having positive refractive power and a meniscus shape; and a fourth lens having a concave object-side surface. The fourth lens has a shape satisfying following condition 1:

$$10 < |R8/F| < 50 \qquad \text{condition 1,}$$

where R8 is a radius of curvature of the object-side surface of the fourth lens, and F is an overall focal length of the imaging optical system.

8 Claims, 8 Drawing Sheets

IMAGING OPTICAL SYSTEM

CROSS-REFERENCE TO RELATED APPLICATIONS

This application claims the priority of Korean Patent Application No. 2009-0104974 filed on Nov. 2, 2009, in the Korean Intellectual Property Office, the disclosure of which is incorporated herein by reference.

BACKGROUND OF THE INVENTION

1. Field of the Invention

The present invention relates to an imaging optical system, and more particularly, to an imaging optical system installed in a mobile communications terminal and a personal digital assistant (PDA) or utilized in a surveillance camera and a digital camera.

2. Description of the Related Art

Recently, with regard to an image pickup system, studies have been conducted on camera modules for telecommunication terminals, digital still cameras (DSCs), camcorders, and personal computer (PC) cameras which are attached to personal computers as imaging devices. Here, an image-forming lens system is the most important component of such an image pickup system in obtaining an image.

The lens system needs to be high-performing in terms of resolution and image quality, thus complicating a lens configuration. However, such structural and optical complexity leads to an increase in size, posing a difficulty to the realization of compactness and thinness in the lens system.

For example, a camera module should necessarily be miniaturized to be installed in a mobile phone more efficiently. Also, an image sensor such as a charge coupled device (CCD) or a complementary metal oxide semiconductor (CMOS) employed in the camera module has an increasingly higher resolution, with a concurrent decrease in pixel size. The lens system included in the camera module needs to be smaller-sized and thinner while attaining high resolution and superior optical capabilities.

In the case of using a 3-megapixel image sensor (CCD or CMOS), only three or less sheets of lenses may be arranged to satisfy optical capabilities and miniaturization. However, in the case that three or less sheets of lenses are applied to a 5 or more-megapixel image sensor (CCD or CMOS), each of the lenses should be increased in refractive power, and accordingly this poses a difficulty to machininability. For this reason, it is difficult to satisfy both requirements of high performance and miniaturization at the same time. Also, even though four or more sheets of lenses are employed, if those lenses are formed of spherical lenses, a total length of the optical system increases, and accordingly miniaturization is not ensured.

Therefore, there has been a demand for a lens system for a camera module which can be subminiaturized, yet realize high performance optical capabilities.

SUMMARY OF THE INVENTION

An aspect of the present invention provides an imaging optical system capable of achieving high resolution and subminiaturization and being superior in optical capabilities with only four sheets of lenses.

An aspect of the present invention also provides a subminiature and lighter imaging optical system having the potential for mass production with low production costs by using at least three or more sheets of plastic lenses.

An aspect of the present invention also provides an imaging optical system suitable for a 5 or more-megapixel camera module.

According to an aspect of the present invention, there is provided an imaging optical system including, sequentially from an object side in front of an image plane: a first lens having positive refractive power and two convex surfaces; a second lens having negative refractive power and two concave surfaces; a third lens having positive refractive power and a meniscus shape; and a fourth lens having a concave object-side surface.

The fourth lens may have a shape satisfying following condition 1:

$$10 < |R8/F| < 50 \qquad \text{condition 1,}$$

where R8 is a radius of curvature of the object-side surface of the fourth lens, and F is an overall focal length of the imaging optical system The first, second and fourth lenses may have refractive power respectively satisfying following conditions 2, 3, and 4:

$$0.4 < f1/F < 0.8 \qquad \text{condition 2,}$$

$$0.6 < |f2/F| < 1.2 \qquad \text{condition 3,}$$

$$0.4 < |f4/F| < 0.8 \qquad \text{condition 4,}$$

where F is an overall focal length of the imaging optical system, and f1, f2, and f4 are a focal length of the first, second and fourth lenses, respectively.

The first to fourth lenses may be made of plastic. Also, the first to fourth lenses may be aspherical lenses. The imaging optical system may further include an aperture stop disposed in front of an object-side surface of the first lens.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
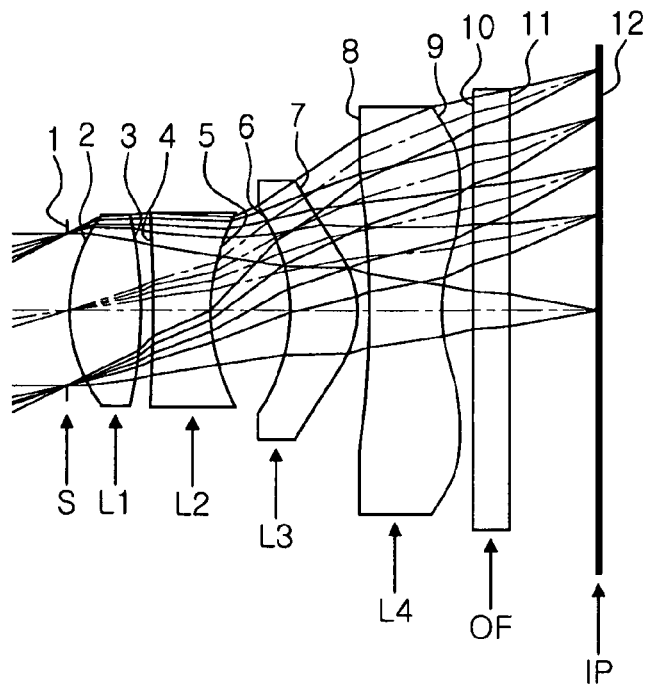
FIG. 1 is a lens configuration view illustrating an imaging optical system according to a first embodiment of the present invention.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity.

FIG. 1 is a lens configuration view illustrating an imaging optical system according to a first embodiment of the present invention. In the following lens configuration views, the thicknesses, sizes and shapes of the lenses may be exaggerated for clarity. In particular, the shapes of spherical or aspherical surfaces shown in the lens configuration views are only exemplary and should not be construed as being limiting thereto.

As shown in FIG. 1, the imaging optical system according to this embodiment may include first, second, third and fourth lenses L1, L2, L3 and L4. The first lens L1 has positive refractive power and two convex refractive surfaces 2 and 3. The second lens L2 has negative refractive power and two concave refractive surfaces 4 and 5. The third lens L3 has positive refractive power and a meniscus shape. The fourth lens L4 has a concave object-side refractive surface 8. This imaging optical system may further include an aperture stop S disposed in front of the object-side surface of the first lens L1

According to this embodiment, the first to fourth lenses L1 to L4 may be made of plastic and formed of aspherical lenses. Since a lens made of plastic is manufactured by injection molding, even though the lens has a small radius of curvature or external diameter, it can be easily mass produced at low cost. Also, since a press temperature is adjusted to be reduced, the abrasion of a mold is prevented and the number of exchanges and repairs, as well as the amount of maintenance is reduced, thereby promoting cost reduction as compared with a lens made of glass requiring a grinding process.

Here, the lens made of plastic may include a lens subject to surface coating for the purpose of preventing reflection or improving surface hardening by using plastic as a basic material. Also, in order to restrict the refractivity change of a plastic lens according to temperature change, the plastic may be mixed with inorganic particles.

Meanwhile, an optical filter OF, such as an infrared ray filter, a cover glass and the like, is provided between the fourth lens L4 and an image plane IP.

Also, the image plane IP is an image formation surface of an image sensor such as a charge coupled device (CCD) or a complementary metal oxide semiconductor (CMOS).

In the imaging optical system of the present embodiment, the aperture stop S is disposed in front of the object-side surface of the first lens L1. Also, the lenses of the optical system have refractive power distributed in such a way that the lenses, sequentially from the object side, have positive, negative and positive refractive powers. Such a distribution of refractive power enables the imaging optical system to be superior in field curvature characteristics. Also, these four sheets of lenses are configured to have aspherical surfaces to thereby enhance resolution while reducing distortion and spherical aberration. This produces a compact optical system superior in optical characteristics.

In addition, the aperture stop S is provided in front of the object-side surface of the first lens L1 to thereby restrict an effective aperture of the lenses disposed behind the aperture stop. Furthermore, an exit pupil may be located far toward the object side from a last image-side surface. This lowers a light emitting angle and beneficially shortens a total length of the optical system.

With this overall configuration, operational effects of following conditions 1 to 4 will be examined hereafter.

$$10<|R8/F|<50 \qquad \text{condition 1,}$$

where R8 is the refractivity of the object-side surface 8 of the fourth lens L4, and F is an overall focal length of the optical system.

Condition 1 governs a ratio of a radius R8 of curvature of the object-side refractive surface 8 of the fourth lens L4 to the overall focal length F of the optical system. That is, condition 1 prescribes the shape of the fourth lens L4.

Deviation from lower and upper limits of condition 1 deteriorates telecentric characteristics and distortion characteristics of the optical system.

$$0.4<f1/F<0.8 \qquad \text{condition 2,}$$

where f1 is a focal length of the first lens L1, and F is an overall focal length of the optical system.

Condition 2 governs a ratio between the focal length f1 of the first lens L1 and the overall focal length F of the optical system. That is, condition 2 prescribes the refractive power of the first lens L1.

Deviation from a lower limit of condition 2 increases the refractive power of the first lens L1, thus making it difficult to correct spherical aberration. Deviation from an upper limit of condition 2 increases chromatic aberration.

$$0.6<|f2/F|<1.2 \qquad \text{condition 3,}$$

where f2 is a focal length of the second lens L2, and F is an overall focal length of the optical system.

Condition 3 governs a ratio between the focal length f2 of the second lens L2 and the overall focal length F of the optical system. That is, condition 3 prescribes the refractive power of the second lens L2.

Similar to condition 2, deviation from a lower limit of condition 3 increases the refractive power of the second lens L2, thus making it difficult to correct spherical aberration. Deviation from an upper limit of condition 3 increases chromatic aberration, posing a difficulty to correct axial chromatic aberration.

$$0.4<|f4/F|<0.8 \qquad \text{condition 4,}$$

where f4 is a focal length of the fourth lens L4, and F is an overall focal length of the optical system.

Condition 4 governs a ratio between the focal length f4 of the fourth lens L4 and the overall focal length F of the optical system. That is, condition 4 prescribes the refractive power of the fourth lens L4.

Deviation from a lower limit of condition 4 deteriorates telecentric characteristics, thus making it difficult to correct distortion. Deviation from an upper limit of condition 4 decreases the refractive power of the fourth lens L4, thus not ensuring the miniaturization of the optical system.

Now, the present invention will be examined in greater detail through specific numerical examples.

As described above, in the following first to fourth embodiments, an imaging optical system includes a first lens L1 having positive refractive power and two convex surfaces, a second lens L2 having negative refractive power and two concave surfaces, a third lens L3 having positive refractive power and a meniscus shape, and a fourth lens L4 having a concave object-side surface, and an aperture stop S is provided in front of the object-side surface of the first lens L1. Also, an optical filter OF such as an infrared ray filter, a cover glass and the like may be provided between the fourth lens L4 and an image plane IP. Here, the image plane IP is an image formation surface of an image sensor such as a CCD or a CMOS.

Meanwhile, aspherical coefficients used in each of the embodiments herein are obtained from following Equation 1, and "E and a number following the E" used in a conic constant K and aspherical coefficients A, B, C, D, E, F represent powers of 10. For example, E+01 and E-02 represent $10^1$ and $10^{-2}$, respectively.

$$Z = \frac{cY^2}{1 + \sqrt{1 - (1+K)c^2 Y^2}} + AY^4 + BY^6 + CY^8 + DY^{10} + EY^{12} + FY^{14} + \ldots ,$$

Equation 1 where Z is a distance from a vertex of a lens in an optical axis, Y is a distance in a direction perpendicular to the optical axis, c is a reciprocal number of a radius r of curvature at the vertex of the lens, K is a conic constant, and A, B, C, D, E, F are aspherical coefficients.

Also, MTF (Modulation Transfer Function) depends on a spatial frequency of a cycle per millimeter in an MTF graph of each of the embodiments and is defined by the following Equation 2 between a maximum intensity (Max) and a minimum intensity (Min) of light.

$$MTF = \frac{Max - Min}{Max + Min}$$

Equation 2

That is, MTF is most ideal when 1 and a smaller MTF deteriorates resolution.

First Embodiment

Figure 2:
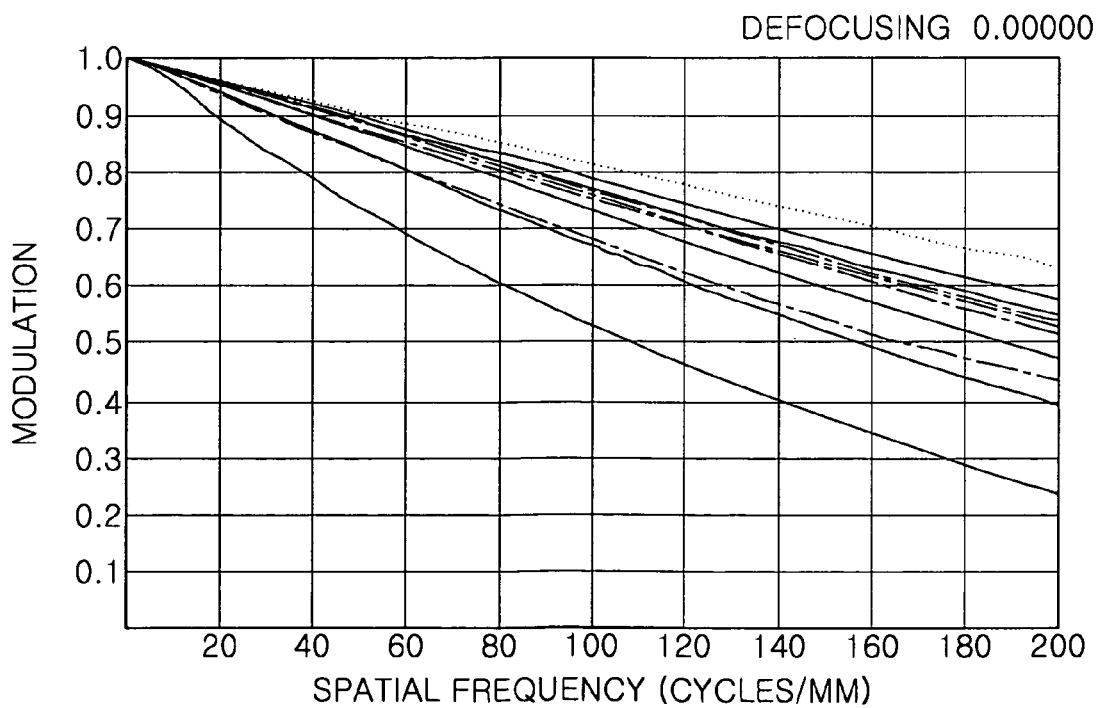
FIG. 2 is a graph illustrating modulation transfer function (MTF) characteristics of the first embodiment shown in FIG. 1.
Figure 3:
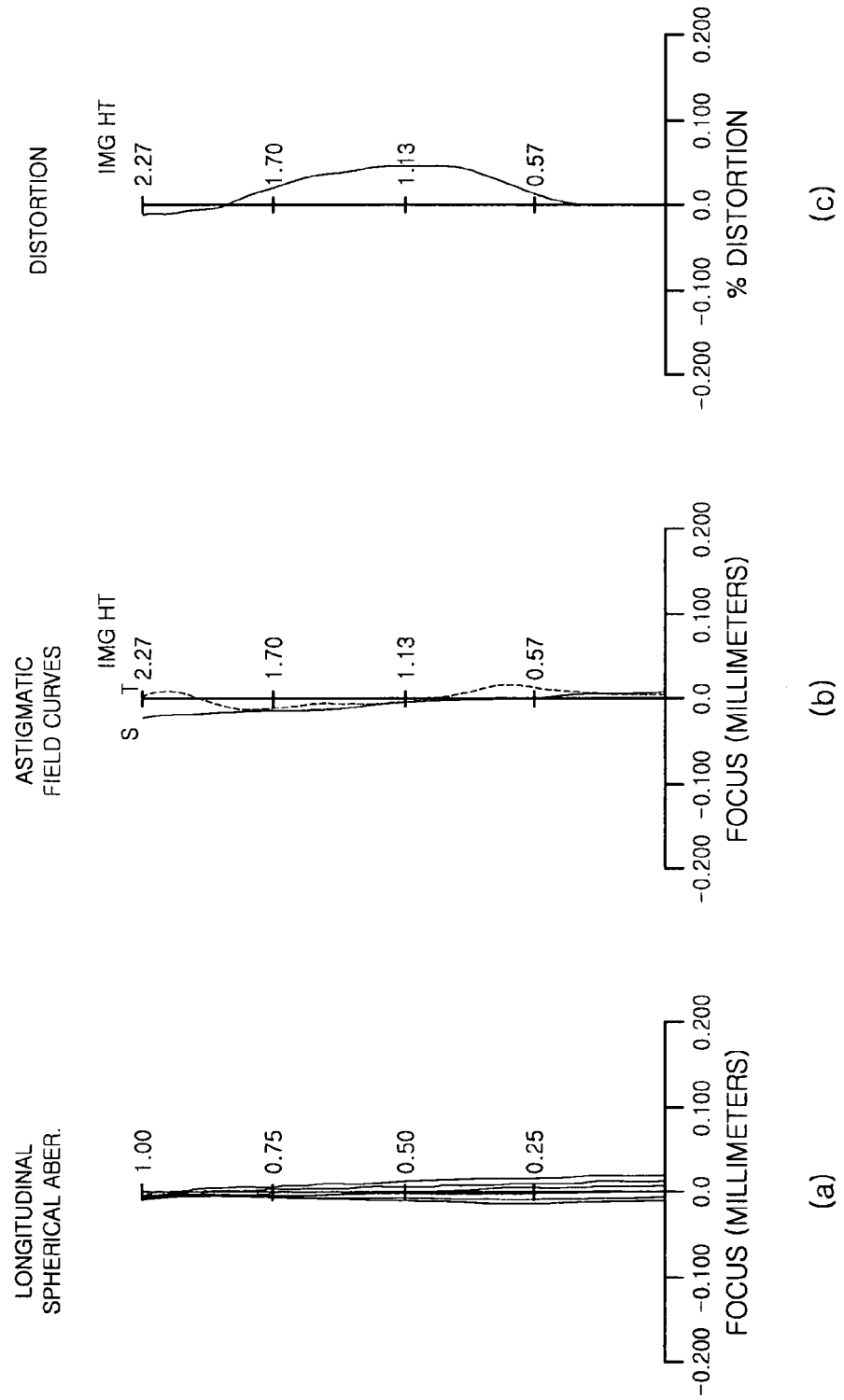
FIG. 3 is an aberrational diagram illustrating the first embodiment shown in FIG. 1, in which A represents spherical aberration, B represents astigmatism and C represents distortion.

Table 1 below shows numerical values of an imaging optical system according to a first embodiment of the present invention. FIG. 1 is a lens configuration view illustrating the imaging optical system according to the first embodiment of the present invention, and FIG. 2 is an MTF graph of the imaging optical system shown in Table 1 and FIG. 1. FIGS. 3A through 3C show aberrations of the imaging optical system shown in Table 1 and FIG. 1.

In the first embodiment, a total length TL from the object-side surface 2 of the first lens L1 to an image plane 12 is 4.45 mm, and an overall focal length F of the optical system is 3.790 mm.

TABLE 1

| SURFACE NO. | RADIUS OF CURVATURE (R) | THICKNESS OR DISTANCE (t) | REFRACTIVE INDEX ($N_d$) | FOCAL LENGTH ($v_d$) | REMARK |
|---|---|---|---|---|---|
| 1 | ∞ | 0.1 | | | APERTURE STOP |
| *2 | 3.10844 | 0.8 | 1.53 | 55.8 | FIRST LENS |
| *3 | −2.07297 | 0.137 | | | |
| 4 | 28.1361 | 0.4 | 1.755 | 27.5 | SECOND LENS |
| 5 | 2.50075 | 0.758239 | | | |
| *6 | −0.79631 | 0.5 | 1.53 | 55.8 | THIRD LENS |
| *7 | −0.91331 | 0.1 | | | |
| *8 | 2.5 | 0.9 | 1.53 | 55.8 | FOURTH LENS |
| *9 | 2.48191 | 1.084789 | | | |
| 10 | ∞ | 0.3 | 1.51 | 64.2 | OPTICAL FILTER |
| 11 | ∞ | 0.791 | | | |
| 12 | ∞ | 0 | | | IMAGE PLANE |

Values of aspherical coefficients in the first embodiment according to Equation 1 are noted in Table 2 below.

TABLE 2

| SUREACE NO. | K | A | B | C | D | E |
|---|---|---|---|---|---|---|
| 2 | −43.989860 | 0.106600 | −.326466 | 0.336899 | −.257780 | |
| 3 | 3.094136 | 0.234460E−02 | 0.251352E−01 | −.756211E−01 | 0.684855E−01 | |
| 6 | −1.000000 | 0.114012 | −.314359E−01 | −.699715E−01 | 0.103797 | |
| 7 | −1.000000 | 0.672445E−01 | −.163677E−01 | −.126848E−01 | 0.214028E−01 | |
| 8 | −3.631999 | −.408214E−01 | 0.126811E−01 | −.324838E−02 | 0.353419E−03 | −.807023E−05 |
| 9 | −20.366457 | −.193236E−01 | 0.227732E−02 | −.826040E−03 | 0.909376E−04 | −.619649E−05 |

Second Embodiment

Figure 4:
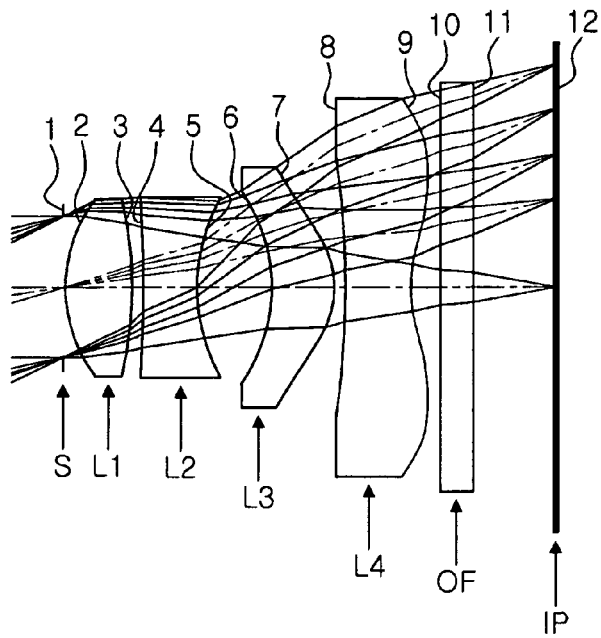
FIG. 4 is a lens configuration view illustrating an imaging optical system according to a second embodiment of the present invention.
Figure 5:
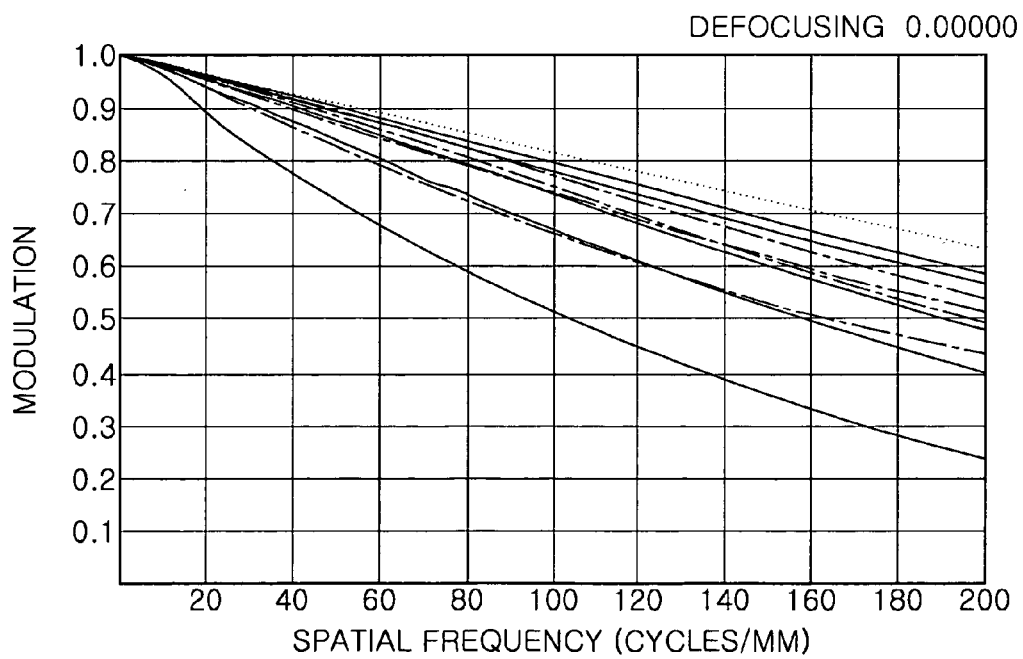
FIG. 5 is a graph illustrating MTF characteristics of the second embodiment shown in FIG. 4.
Figure 6:
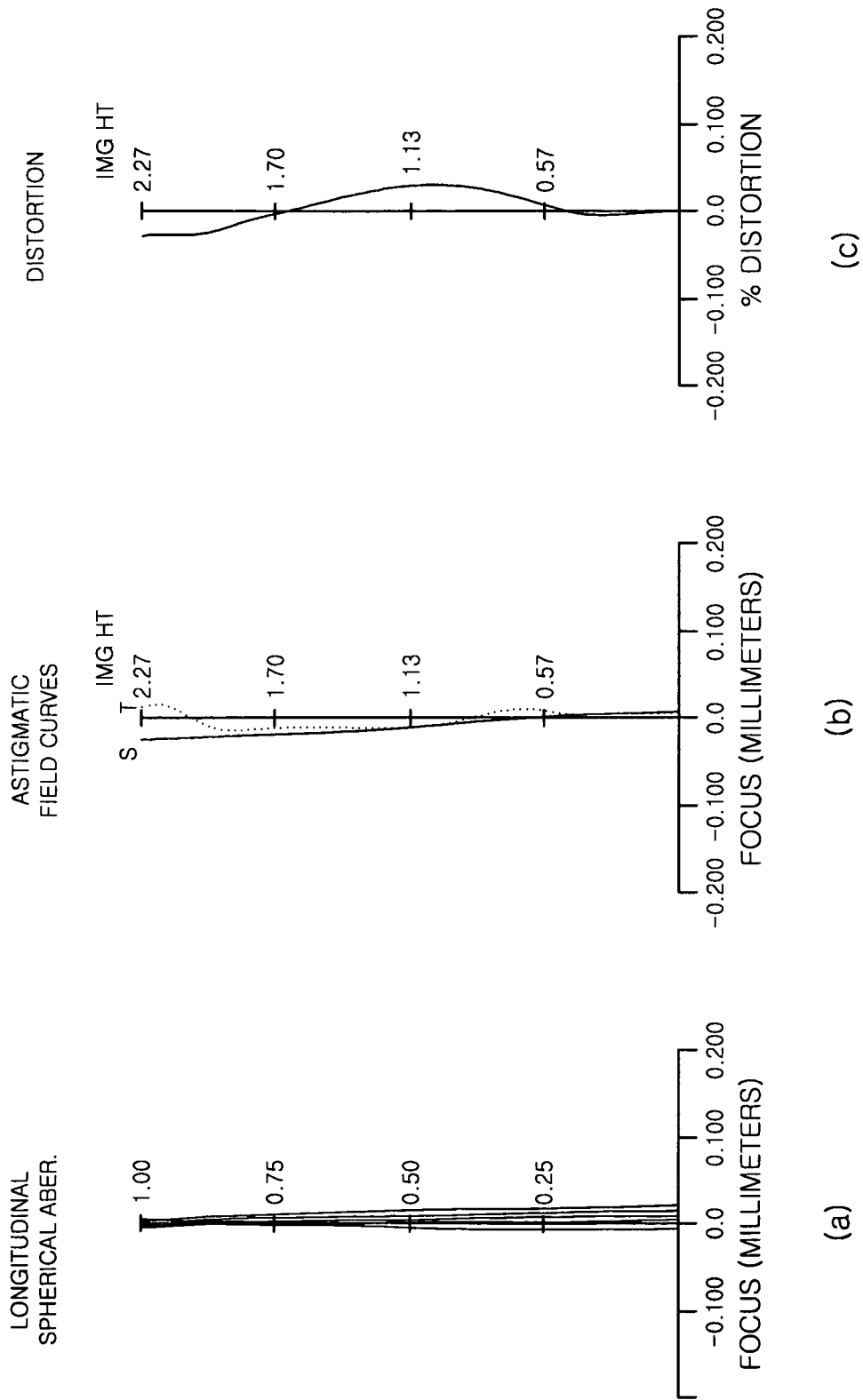
FIG. 6 is an aberrational diagram illustrating the second embodiment shown in FIG. 4, in which A represents spherical aberration, B represents astigmatism and C represents distortion.

Table 3 below shows numerical values of an imaging optical system according to a second embodiment of the present invention. FIG. 4 is a lens configuration view illustrating the imaging optical system according to the second embodiment of the present invention, and FIG. 5 is an MTF graph of the imaging optical system shown in Table 3 and FIG. 4. FIGS. 6A through 6C show aberrations of the imaging optical system shown in Table 3 and FIG. 4.

In the second embodiment, a total length TL from the object-side surface 2 of the first lens L1 to the image plane 12 is 4.45 mm, and an overall focal length F of the optical system is 3.775 mm.

TABLE 3

| SURFACE NO. | RADIUS OF CURVATURE (R) | THICKNESS OR DISTANCE (t) | REFRACTIVE INDEX ($N_d$) | FOCAL LENGTH ($v_d$) | REMARK |
|---|---|---|---|---|---|
| 1 | ∞ | 0.1 | | | APERTURE STOP |
| *2 | 3.14827 | 0.83 | 1.53 | 55.8 | FIRST LENS |
| *3 | −2.03891 | 0.146256 | | | |
| 4 | 39.9546 | 0.4 | 1.755 | 27.5 | SECOND LENS |
| 5 | 2.50095 | 0.833843 | | | |
| *6 | −0.70393 | 0.4 | 1.54 | 40.97 | THIRD LENS |
| *7 | −0.80713 | 0.130968 | | | |
| *8 | 2.5 | 0.9 | 1.53 | 55.8 | FOURTH LENS |
| *9 | 2.48191 | 1.084782 | | | |
| 10 | ∞ | 0.3 | 1.51 | 64.2 | OPTICAL FILTER |
| 11 | ∞ | 0.774 | | | |
| 12 | ∞ | 0 | | | IMAGE PLANE |

Values of aspherical coefficients in the second embodiment according to Equation 1 are noted in Table 4 below.

TABLE 4

| SUREACE NO. | K | A | B | C | D | E |
|---|---|---|---|---|---|---|
| 2 | −45.523044 | 0.108371 | −.326707 | 0.340760 | −.251793 | |
| 3 | 2.973763 | 0.746854E−02 | 0.246363E−01 | −.687347E−01 | 0.686567E−01 | |
| 6 | −1.000000 | 0.139154 | 0.434649E−02 | −.640745E−01 | 0.818770E−01 | |
| 7 | −1.000000 | 0.811931E−01 | 0.398471E−03 | −.905095E−02 | 0.200518E−01 | |
| 8 | −3.631999 | −.403881E−01 | 0.126199E−01 | −.324981E−02 | 0.353223E−03 | −.840314E−05 |
| 9 | −20.366457 | −.198755E−01 | 0.240829E−02 | −.836611E−03 | 0.902706E−04 | −.642035E−05 |

Third Embodiment

Figure 7:
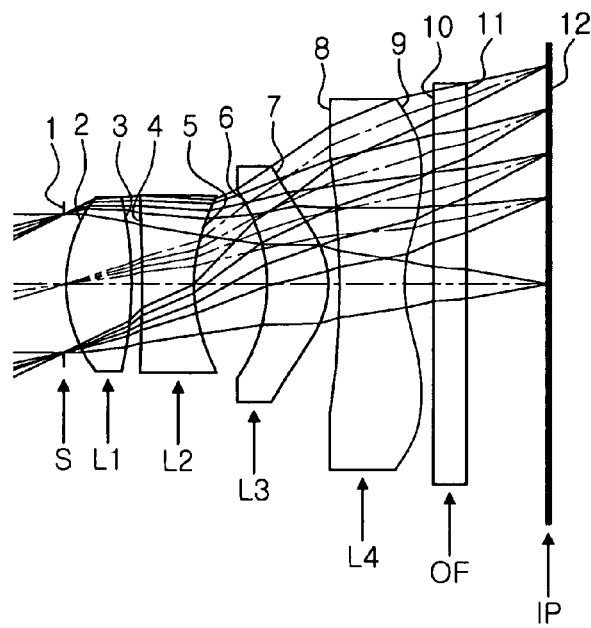
FIG. 7 is a lens configuration view illustrating an imaging optical system according to a third embodiment of the present invention.
Figure 8:
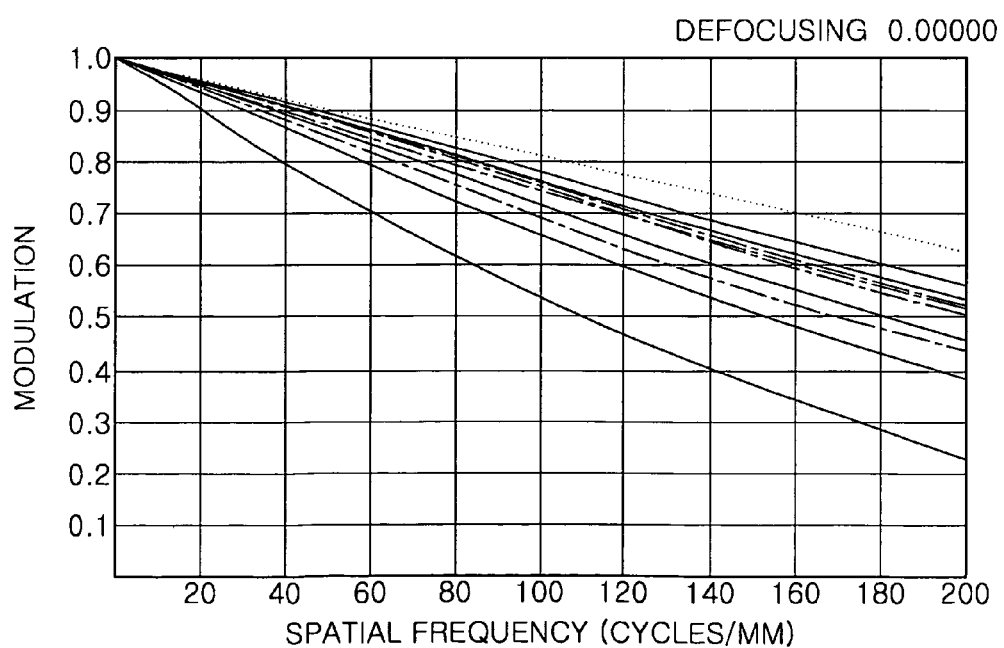
FIG. 8 is a graph illustrating MTF characteristics of the third embodiment shown in FIG. 7.

Table 5 below shows numerical values of an imaging optical system according to a third embodiment of the present invention. FIG. 7 is a lens configuration view illustrating the imaging optical system according to the third embodiment of the present invention, and FIG. 8 is an MTF graph of the imaging optical system shown in Table 5 and FIG. 7. FIGS. 9A through 9C show aberrations of the imaging optical system shown in Table 5 and FIG. 7.

In the third embodiment, a total length TL from the object-side surface 2 of the first lens L1 to the image plane 12 is 4.43 mm, and an overall focal length F of the optical system is 3.800 mm.

TABLE 5

| SURFACE NO. | RADIUS OF CURVATURE (R) | THICKNESS OR DISTANCE (t) | REFRACTIVE INDEX ($N_d$) | FOCAL LENGTH ($v_d$) | REMARK |
|---|---|---|---|---|---|
| 1 | ∞ | 0.1 | | | APERTURE STOP |
| *2 | 2.63918 | 0.857148 | 1.53 | 55.8 | FIRST LENS |
| *3 | −1.98682 | 0.100879 | | | |
| 4 | −434.3358 | 0.4 | 1.755 | 27.5 | SECOND |

TABLE 5-continued

| SURFACE NO. | RADIUS OF CURVATURE (R) | THICKNESS OR DISTANCE (t) | REFRACTIVE INDEX ($N_d$) | FOCAL LENGTH ($v_d$) | REMARK |
|---|---|---|---|---|---|
| 5 | 2.75347 | 0.70808 | | | LENS |
| *6 | −0.67258 | 0.4 | 1.54 | 40.94 | THIRD LENS |
| *7 | −0.80841 | 0.192106 | | | |
| *8 | 2.61538 | 0.946461 | 1.53 | 55.8 | FOURTH LENS |
| *9 | 2.34434 | 0.927419 | | | |
| 10 | ∞ | 0.3 | 1.51 | 64.2 | OPTICAL FILTER |
| 11 | ∞ | 0.667896 | | | |
| 12 | ∞ | 0 | | | IMAGE PLANE |

Values of aspherical coefficients in the third embodiment according to Equation 1 are noted in Table 6 below.

TABLE 6

| SURFACE NO. | K | A | B | C | D | E |
|---|---|---|---|---|---|---|
| 2 | −33.087181 | 0.154263 | −.419731 | 0.477972 | −.365690 | |
| 3 | 2.799077 | 0.434327E−02 | 0.263373E−01 | −.824027E−01 | 0.730932E−01 | |
| 6 | −1.000000 | 0.158798 | 0.301625E−01 | −.297628E−01 | 0.578550E−01 | |
| 7 | −1.000000 | 0.104079 | 0.866238E−01 | 0.472347E−01 | −.858570E−02 | |
| 8 | −7.531698 | −.317411E−01 | 0.122108E−01 | −.330684E−02 | 0.371227E−03 | −.103125E−04 |
| 9 | −20.366457 | −.256238E−01 | 0.448040E−02 | −.959916E−03 | 0.719163E−04 | −.482315E−05 |

Fourth Embodiment

Figure 10:
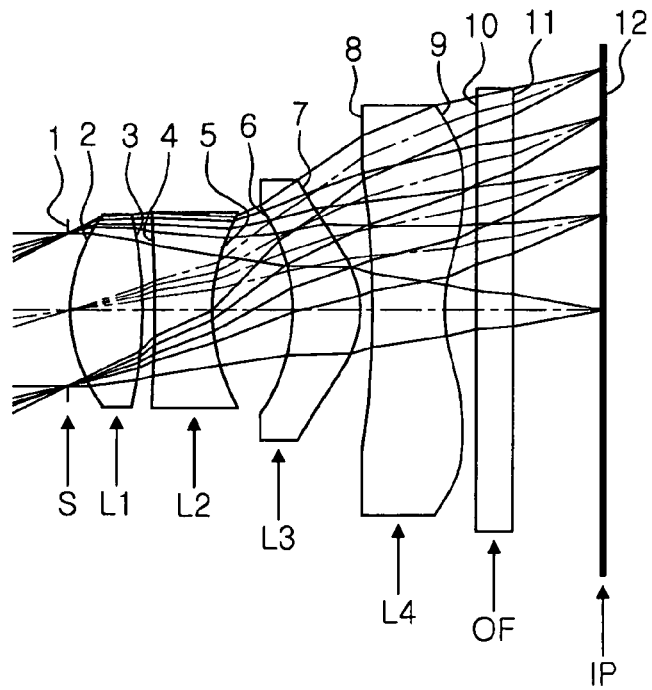
FIG. 10 is a lens configuration view illustrating an imaging optical system according to a fourth embodiment of the present invention.
Figure 11:
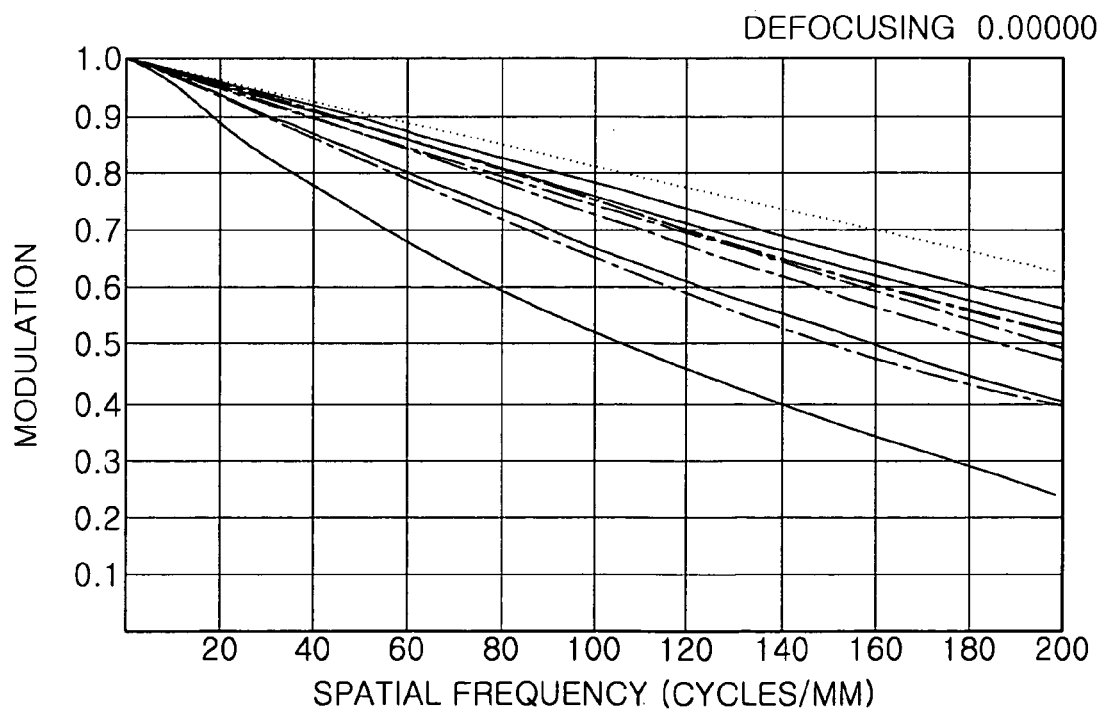
FIG. 11 is a graph illustrating MTF characteristics of the fourth embodiment shown in FIG. 10.
Figure 12:
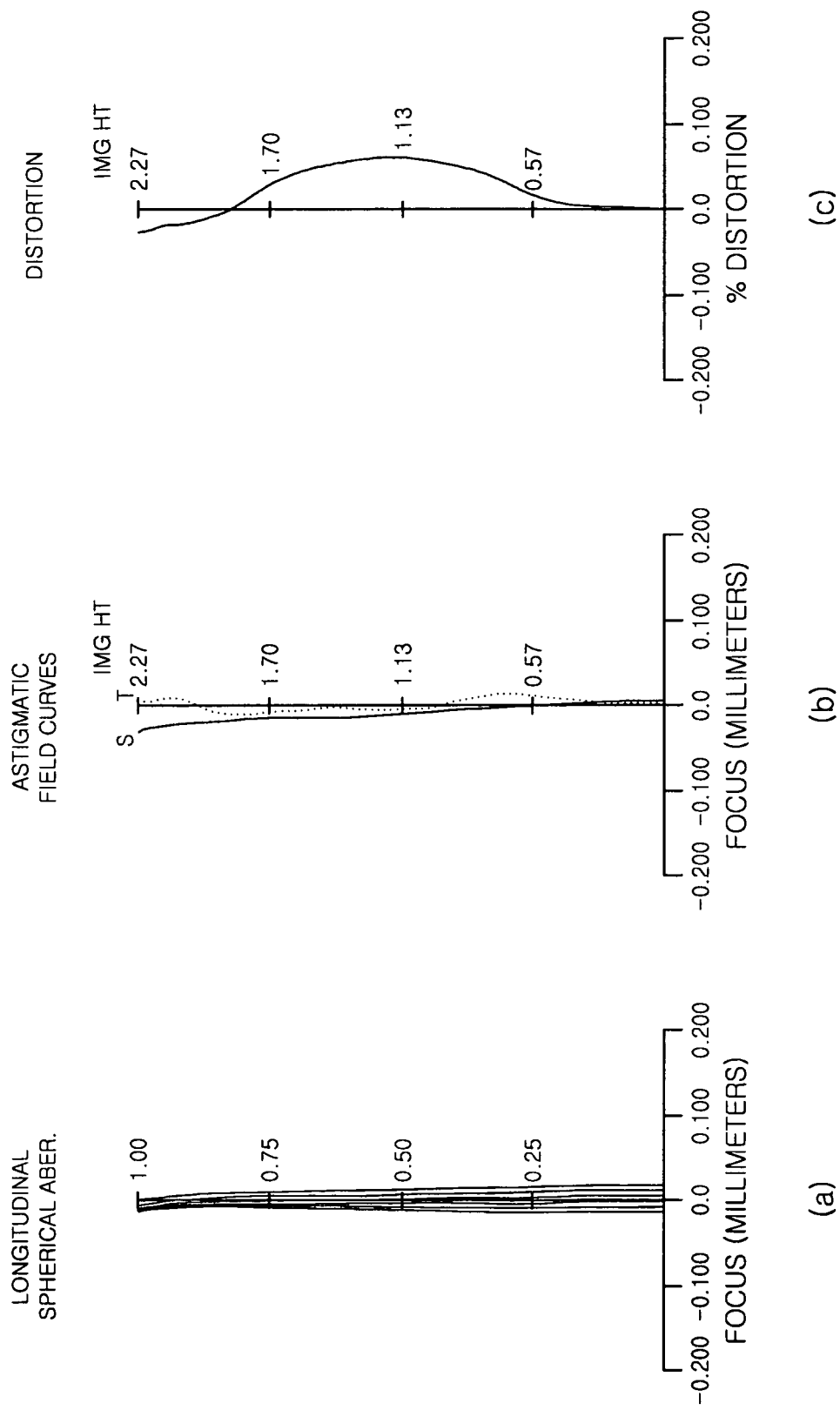
FIG. 12 is an aberrational diagram illustrating the fourth embodiment shown in FIG. 10, in which A represents spherical aberration, B represents astigmatism and C represents distortion.

Table 7 below shows numerical values of an imaging optical system according to a fourth embodiment of the present invention. FIG. 10 is a lens configuration view illustrating the imaging optical system according to the fourth embodiment of the present invention, and FIG. 11 is an MTF graph of the imaging optical system shown in Table 7 and FIG. 10. FIGS. 12A through 12C show aberrations of the imaging optical system shown in Table 7 and FIG. 10.

In the fourth embodiment, a total length TL from the object-side surface 2 of the first lens L1 to the image plane 12 is 4.45 mm, and an overall focal length F of the optical system is 3.790 mm.

TABLE 7

| SURFACE NO. | RADIUS OF CURVATURE (R) | THICKNESS OR DISTANCE (t) | REFRACTIVE INDEX ($N_d$) | FOCAL LENGTH ($v_d$) | REMARK |
|---|---|---|---|---|---|
| 1 | ∞ | 0.05 | | | APERTURE STOP |
| *2 | 1.87093 | 0.619492 | 1.74 | 49.2 | FIRST LENS |
| *3 | ∞ | 0.1 | | | |
| 4 | −17.20577 | 0.358085 | 1.63 | 23.4 | SECOND LENS |
| 5 | 2.57988 | 0.355744 | | | |
| *6 | −8.81676 | 0.728217 | 1.54 | 56.1 | THIRD LENS |
| *7 | −3.94019 | 0.659929 | | | |
| *8 | 1.3489 | 0.55 | 1.54 | 56.1 | FOURTH LENS |
| *9 | 1.15509 | 0.280414 | | | |
| 10 | ∞ | 0.3 | 1.51 | 64.2 | OPTICAL FILTER |
| 11 | ∞ | 0.674378 | | | |
| 12 | ∞ | 0 | | | IMAGE PLANE |

Values of aspherical coefficients in the fourth embodiment according to Equation 1 are noted in Table 8 below.

TABLE 8

| SURFACE NO. | K | A | B | C | D | E |
|---|---|---|---|---|---|---|
| 2 | 0.000000 | 0.149245E−01 | 0.529595E−02 | −.136041E−01 | 0.879296E−02 | |
| 3 | 0.000000 | 0.282724E−01 | 0.587664E−01 | −.661222E−01 | 0.668223E−01 | |
| 6 | 0.000000 | −.122023 | 0.146045 | −.179758 | 0.147747 | |
| 7 | 8.438373 | −.200823 | 0.229795 | −.155497 | 0.620305E−01 | |
| 8 | −3.656801 | −.240622 | 0.795562E−01 | −.129760E−01 | 0.491936E−03 | |
| 9 | −3.249399 | −.185466 | 0.828448E−01 | −.274480E−01 | 0.524215E−02 | −.465955E−03 |

It is understood through the above embodiments that the imaging optical system having high resolution as shown in FIGS. 2, 5, 8 and 11 and being superior in aberrational characteristics as shown in FIGS. 3, 6, 9 and 12 can be obtained.

In the meantime, values of conditions 1 to 3 for the above first to fourth embodiments are noted in Table 9.

TABLE 9

| | First embodiment | Second embodiment | Third embodiment | Fourth embodiment |
|---|---|---|---|---|
| Condition 1 | 30.343 | 30.464 | 26.316 | 30.343 |
| Condition 2 | 0.662 | 0.652 | 0.664 | 0.663 |
| Condition 3 | 1.031 | 1.008 | 1.083 | 1.046 |
| Condition 4 | 0.640 | 0.636 | 0.642 | 0.644 |

Figure 9:
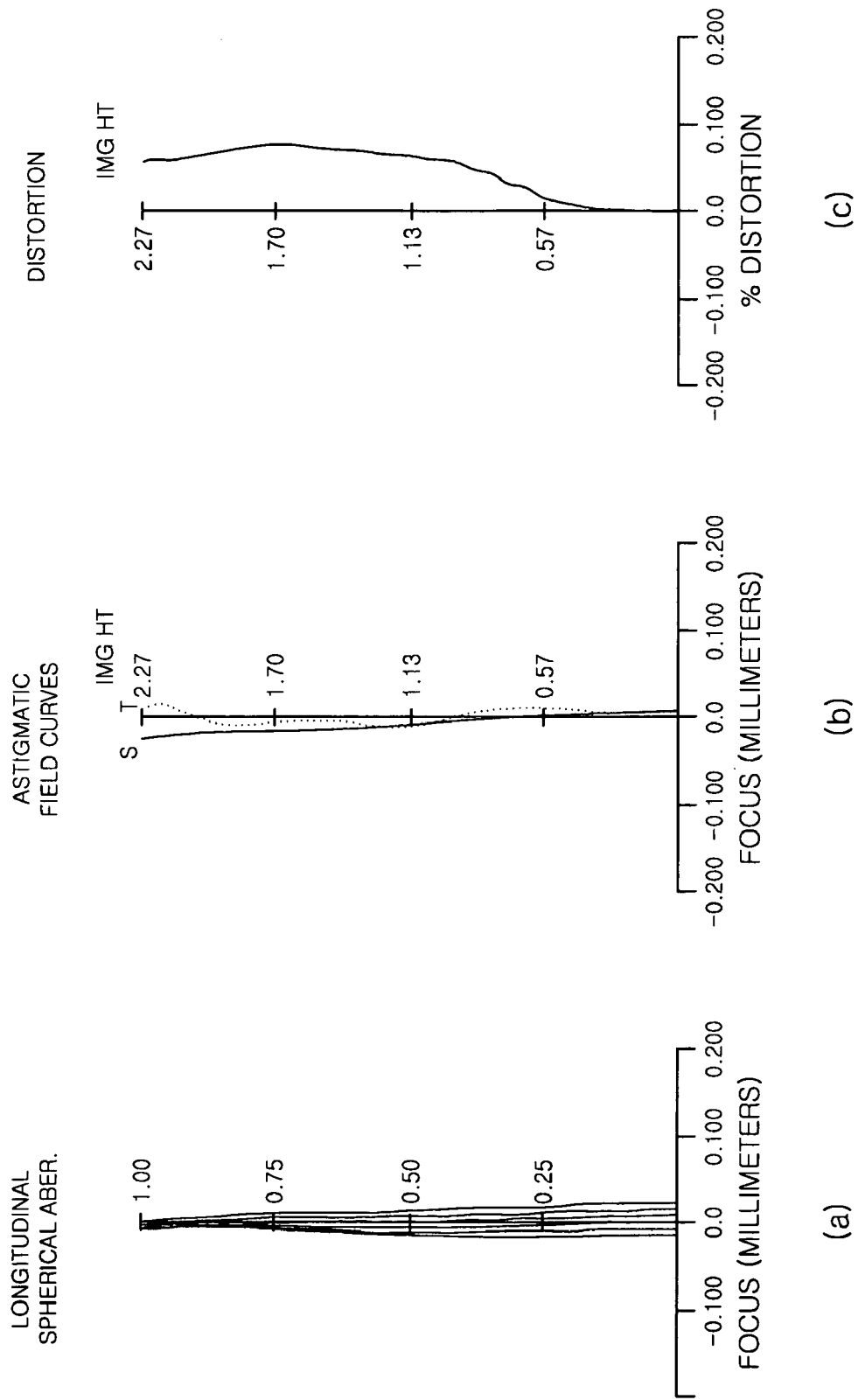
FIG. 9 is an aberrational diagram illustrating the third embodiment shown in FIG. 7, in which A represents spherical aberration, B represents astigmatism and C represents distortion.

As shown in FIG. 9, the first to fourth embodiments of the invention satisfy conditions 1 to 4.

As set forth above, according to exemplary embodiments of the invention, the imaging optical system is suitable for subminiature optical devices such as a mobile phone camera using an image sensor such as a CCD or a CMOS and is capable of minimizing various aberrations and obtaining an image having high resolution and high definition by adjusting a radius of curvature of refractive surfaces of each of the lenses and using aspherical surfaces.

Furthermore, by using a plurality of plastic lenses, it is easy to mass produce a lighter and lower-cost imaging optical system.

While the present invention has been shown and described in connection with the exemplary embodiments, it will be apparent to those skilled in the art that modifications and variations can be made without departing from the spirit and scope of the invention as defined by the appended claims.

What is claimed is:

1. An imaging optical system comprising, sequentially from an object side in front of an image plane:
   a first lens having positive refractive power and two convex surfaces;
   a second lens having negative refractive power and two concave surfaces;
   a third lens having positive refractive power and a meniscus shape; and
   a fourth lens having a concave object-side surface,
   wherein the fourth lens has a shape satisfying following condition 1:

$10 < |R8/F| < 50$     condition 1, where R8 is a radius of curvature of the object-side surface of the fourth lens, and F is an overall focal length of the imaging optical system.

2. The imaging optical system of claim 1, wherein the first lens has refractive power satisfying following condition 2:

$0.4 < f1/F < 0.8$     condition 2, where f1 is a focal length of the first lens, and F is an overall focal length of the imaging optical system.

3. The imaging optical system of claim 1, wherein the second lens has refractive power satisfying following condition 3:

$0.6 < |f2/F| < 1.2$     condition 3, where f2 is a focal length of the second lens, and F is an overall focal length of the imaging optical system.

4. The imaging optical system of claim 1, wherein the fourth lens has refractive power satisfying following condition 4:

$0.4 < |f4/F| < 0.8$     condition 4, where f4 is a focal length of the fourth lens, and F is an overall focal length of the imaging optical system.

5. The imaging optical system of claim 1, wherein the first to fourth lenses are made of plastic.

6. The imaging optical system of claim 1, wherein the first to fourth lenses are aspherical lenses.

7. The imaging optical system of claim 1, further comprising an aperture stop disposed in front of an object-side surface of the first lens.

8. An imaging optical system comprising, sequentially from an object side in front of an image plane:
   a first lens having positive refractive power and two convex surfaces;
   a second lens having negative refractive power and two concave surfaces;
   a third lens having positive refractive power and a meniscus shape; and
   a fourth lens having a concave object-side surface,
   wherein the second lens has refractive power satisfying following condition 3:

$0.6 < |f2/F| < 1.2$     condition 3, where f2 is a focal length of the second lens, and F is an overall focal length of the imaging optical system.

* * * * *